(12) United States Patent
Ichihashi et al.

(10) Patent No.: US 10,172,377 B2
(45) Date of Patent: Jan. 8, 2019

(54) PET FOOD FOR DOGS, METHOD FOR MANUFACTURE OF PET FOOD FOR DOGS, AND METHOD FOR FEEDING OF PET FOOD FOR DOGS

(71) Applicants: Unicharm Corporation, Ehime (JP); Teikei ebisu Corporation, Miyakonojo-shi, Miyazaki (JP)

(72) Inventors: Masaki Ichihashi, Itami (JP); Tetsuya Hirano, Itami (JP); Makoto Sonoda, Miyakonojo (JP); Mikayo Minamitani, Miyakonojo (JP)

(73) Assignees: UNICHARM CORPORATION, Ehime (JP); TEIKEI EBISU CORPORATION, Miyazaki (JP)

( * ) Notice: Subject to any disclaimer, the term of this patent is extended or adjusted under 35 U.S.C. 154(b) by 204 days.

(21) Appl. No.: 14/895,929

(22) PCT Filed: Jun. 5, 2014

(86) PCT No.: PCT/JP2014/064946
§ 371 (c)(1),
(2) Date: Dec. 3, 2015

(87) PCT Pub. No.: WO2014/196595
PCT Pub. Date: Dec. 11, 2014

(65) Prior Publication Data
US 2016/0128361 A1    May 12, 2016

(30) Foreign Application Priority Data

Jun. 6, 2013  (JP) ................................. 2013-120261

(51) Int. Cl.
*A23K 50/48*      (2016.01)
*A23K 20/163*     (2016.01)
(Continued)

(52) U.S. Cl.
CPC ............ *A23K 50/48* (2016.05); *A23K 1/1643* (2013.01); *A23K 1/1866* (2013.01); *A23K 20/163* (2016.05)

(58) Field of Classification Search
CPC ........ A23K 40/25; A23K 50/40; A23K 50/45; A23K 50/48; A23V 2200/228;
(Continued)

(56) References Cited

U.S. PATENT DOCUMENTS 3,970,767 A * 7/1976 Tessler .................. C08B 31/006
                                                     426/579
5,887,749 A * 3/1999 Schommer ........... A01K 5/0114
                                                     206/564

(Continued)

FOREIGN PATENT DOCUMENTS

CN       102791144 A    11/2012
GB         2079579 A     1/1982
(Continued)

OTHER PUBLICATIONS

Polo et al: "Use of spray-dried animal plasma in canned chunk recipes containing excess of added water or poultry fat", Animal Feed Science and Technology, Elsevier, Amsterdam, NL, vol. 133, No. 3-4, Jan. 19, 2007 (Jan. 19, 2007), pp. 309-319, ISSN:0377-8401, DOI: 10.1016/J.ANIFEEDSCI.2006.04.008.
(Continued)

*Primary Examiner* — Walter A Moore
(74) *Attorney, Agent, or Firm* — Hauptman Ham, LLP

(57) ABSTRACT

There is provided pet food for dogs, in which the pet food is gel type pet food, the moisture content is 50% by weight or greater, the viscosity measured by a rotational viscometer is in a range of 30 dPa·s to 70 dPa·S, the viscosity measured
(Continued)

by a Bostwick viscometer is in a range of 0.1 cm/min to 5.0 cm/min, and one or more gelling agents and one or more thickeners are contained.

6 Claims, 1 Drawing Sheet

(51) Int. Cl.
    *A23K 1/16*     (2006.01)
    *A23K 1/18*     (2006.01)
(58) Field of Classification Search
    CPC ........ A23V 2200/242; A23V 2200/244; A23V 2250/507; A23V 2250/5072; A23V 2250/5086; A23V 2250/506; A23V 2250/5036
    See application file for complete search history.

(56) References Cited

U.S. PATENT DOCUMENTS

| | | | |
|---|---|---|---|
| 6,911,224 B1* | 6/2005 | May et al. | A23K 10/20 426/90 |
| 2001/0041202 A1* | 11/2001 | Dupont et al. | A23K 50/48 426/407 |
| 2004/0131745 A1 | 7/2004 | Fernandes et al. | |
| 2005/0031673 A1* | 2/2005 | Saylock | A61K 9/0056 424/442 |
| 2006/0210675 A1* | 9/2006 | Gifford | A23K 10/20 426/106 |
| 2011/0300256 A1* | 12/2011 | Watelain | A23K 10/20 426/2 |
| 2015/0140163 A1* | 6/2015 | Deckard et al. | A23K 1/004 426/2 |

FOREIGN PATENT DOCUMENTS

| | | |
|---|---|---|
| JP | 11-221025 A | 8/1999 |
| JP | 2007-20448 A | 2/2007 |
| JP | 2008-148714 A | 7/2008 |
| JP | 2012-514457 A | 6/2012 |
| WO | 2010/080144 A2 | 7/2010 |
| WO | 2010/104572 A1 | 9/2010 |

OTHER PUBLICATIONS

Search Report in EP Application No. 14808005.4, dated Mar. 2, 2016.
International Search Report dated Aug. 26, 2014, corresponding to International Application No. PCT/JP2014/064946.
Pet Paradise "Diet Hojo Shokuhin, Kozuko o haigo" Wanchan-yo kanten de nagomi diet, [onine], Aug. 31, 2011 (archive date), [retrieval date Aug. 15, 2014].
"Pet yohin guide Dog-hen", Dog Paradise 2013, Apr. 2013, p. 74.
Delicatessen Toriniku to liver no wafu gelee, Tiara Pets, [online], May 23, 2013 (archive date), [retrieval date Aug. 15, 2014] and a partial English translation, 5pp.
Office Action in CN Application No. 201480031938.8, dated Oct. 23, 2018, 16pp.

* cited by examiner

PET FOOD FOR DOGS, METHOD FOR MANUFACTURE OF PET FOOD FOR DOGS, AND METHOD FOR FEEDING OF PET FOOD FOR DOGS

RELATED APPLICATIONS

This application is a National Phase of International Application Number PCT/JP2014/064946, filed Jun. 5, 2014, and claims priority of Japanese Patent Application No. 2013-120261, filed Jun. 6, 2013, the contents of which are incorporated herein by reference.

TECHNICAL FIELD

Technical Field

The present invention relates to pet food for dogs. More specifically, the present invention relates gel-like pet food for dogs containing a gelling agent and a thickener.

Background Art

In recent years, various types of pet food are on the market. Dry type pet food with a low moisture content is the mainstream because dry type pet food has excellent storage stability and is inexpensive. Meanwhile, wet type pet food which contains a liquid-like soup and whose moisture content is high is increasingly sold.

Further, among wet type pet food, pet food which can be eaten without chewing in a case of a pet that does not have teeth or has weak teeth because of juvenility, an old age, or disease by forming the soup portion in a jelly state is disclosed (PTL 1).

CITATION LIST

Patent Literature

[PTL 1] Japanese Unexamined Patent Application, First Publication No. 2007-20448

SUMMARY OF INVENTION

Technical Problem

When pet food whose soup portion is in a jelly state is intended to be provided for a pet, it is necessary for a user to feed the pet after the jelly-like pet food is loosened by the user and this process takes time and labor in some cases.

In addition, when jelly-like pet food is intended to be provided for a pet in a state of being mixed with dry type pet food, the jelly is unlikely to be loosened in the jelly-like pet food and is not easily mixed with the dry type pet food in some cases.

The jelly portion may be in a liquid state in order to be easily mixed with dry type pet food. In a case where the jelly portion is in a liquid state, it is preferable that the liquid portion has fluidity in order to be easily mixed with the dry type pet food. However, there is a problem in that the liquid portion with high fluidity becomes easily adhered to a container used for holding the pet food and the container becomes dirty easily.

The present invention has been made in consideration of the above-described problems and an object thereof is to provide pet food for dogs which can be easily mixed with dry type pet food for the user, particularly, pet food for dogs which can be easily mixed with dry type pet food and is unlikely to make a container dirty, a method of producing the pet food, and a method of the feeding of the pet food.

Solution to Problem

According to a first aspect of the invention, there is provided a Pet food for dogs, in which the pet food is gel type pet food, the moisture content is 50% by weight or greater, the viscosity measured by a rotational viscometer is in a range of 30 dPa·s to 70 dPa·S, the viscosity measured by a Bostwick viscometer is in a range of 0.1 cm/min to 5.0 cm/min, the pet food containing at least one gelling agent and at least one thickener.

According to a second aspect of the invention, in the pet food for dogs according to the first aspect, the gelling agent is at least one selected from the group consisting of locust bean gum, carrageenan, agar, gellan gum, pectin, and alginic acid, and the thickener is at least one selected from the group consisting of xanthan gum, guar gum, starch, gum Arabic, and tara gum.

According to a third aspect of the present invention, in the pet food for dogs according to the first or second aspect, the ratio of fractions which do not pass through a sieve having a mesh of 10 mm is in a range of 70% by weight to 95% by weight.

According to a fourth aspect of the present invention, in the pet food for dogs according to any one of the first to third aspects, the ratio of fractions which do not pass through a sieve having a mesh of 4 mm is in a range of 75% by weight to 99% by weight.

According to a fifth aspect of the present invention, the pet food for dogs according to any one of the first to fourth aspects contains flakes derived from at least one raw material selected from a group consisting of cattle, chicken, sheep, pigs, tuna, bonito, sardines, barracuda, sea bream, flounder, mackerel, and horse mackerel, and the major axis of the flakes is 15 mm or less.

According to a sixth aspect of the present invention, the pet food for dogs according to any one of the first to fifth aspects contains at least two ingredients selected from a group consisting of seafood, meat, vegetables, grains, mushrooms, eggs, and milk.

According to a seventh aspect of the present invention, in the pet food for dogs according to any one of the first to sixth aspects, the ratio of the ingredients is 60% by weight or less.

According to an eighth aspect of the present invention, there is provided a method of producing the pet food for dogs according to any one of the first to seventh aspects including: a process of adjusting the size of ingredients which contain flakes; a process of mixing the ingredients whose size is adjusted with raw materials of a soup portion to obtain a mixture of the ingredients and the raw materials of the soup portion; a process of filling a pouch container with the mixture of the ingredients and the raw materials of the soup portion; and a process of retort-sterilizing the pouch container.

According to a ninth aspect of the present invention, there is provided a method of feeding of pet food for dogs including feeding a dog by mixing the pet food for dogs according to any one of the first to seventh aspects with dry type pet food.

Advantageous Effects of Invention

According to pet food for dogs of the present invention, for the user, it is possible to easily mix the pet food with dry type pet food and to reduce the time and labor for feeding a dog because the pet food is unlikely to make a container dirty. For the pet, it is possible to improve the palatability for the entirety of the pet food after the pet food and the dry type pet food are mixed and entangled with each other. Therefore, the satisfaction of both of the pet and the user can be improved.

DESCRIPTION OF EMBODIMENTS

Figure 1A:
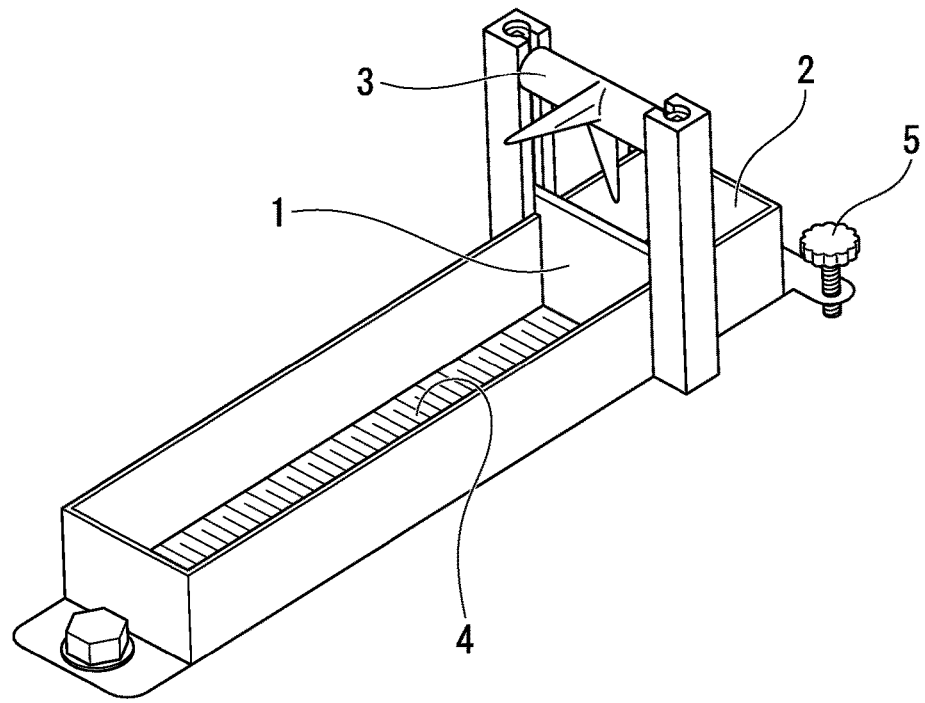
FIG. 1A is a perspective view schematically illustrating a Bostwick viscometer in a state in which a gate thereof is closed.

The present inventors have found that pet food for dogs which is easily mixed with dry type pet food and unlikely to make a container dirty can be obtained when the viscosity of the pet food is in a specific range, thereby completing the present invention.

<<Pet Food for Dogs>>

The pet food for dogs of the present invention is gel type pet food, the moisture content is 50% by weight or greater, the viscosity measured by a rotational viscometer is in the range of 30 dPa·s to 70 dPa·S, the viscosity measured by a Bostwick viscometer is in the range of 0.1 cm/min to 5.0 cm/min, and one or more gelling agents and one or more thickeners are contained therein.

The pet food for dogs of the present invention is wet type pet food and contains a soup portion. Hereinafter, in a case where the soup portion is in a liquid state, the soup portion is referred to as a liquid soup (portion). In addition, in a case where the soup portion is gelled, the soup portion is referred to as a jelly (portion) or a gelee (portion). The gelee of the present specification indicates a type of a jelly and a jelly with relatively low viscosity among jellies. Since the pet food for dogs of the present invention has a viscosity of 30 dPa·s to 70 dPa·s when measured by a rotational viscometer, the pet food for dogs thereof is gel type pet food.

The pet food for dogs of the present invention may contain other ingredients in addition to the soup portion. Other ingredients indicate solids other than the soup portion.

The moisture content of the pet food for dogs of the present invention is 50% by weight or greater. More specifically, the moisture content is preferably in the range of 65% by weight to 95% by weight and still more preferably in the range of 75% by weight to 90% by weight.

<Measurement of Moisture Content>

The moisture content (% by weight) of the pet food is acquired by a normal pressure heating and drying method. The moisture content acquired by this method includes the moisture in ingredients.

(Normal Pressure Heating and Drying Method)

The weight (W1 gram) of an aluminum weighing can is measured in advance as a constant weight value. A sample is put into the aluminum weighing can and the weight (W2 gram) is weighed. Next, the sample is dried under the conditions of 135° C. for 2 hours using a forced circulation type hot air drier. The sample stands and cools in a dry atmosphere (in a silica gel desiccator) and the weight thereof (W3 gram) is weighed. The moisture content is acquired from the obtained respective weights using the following expression.

Moisture content (unit: % by weight)=(W2−W3)÷(W2−W1)×100

<Measurement of Viscosity>

(Rotational Viscometer)

The viscosity of the pet food can be acquired as a numerical value of viscous resistance acting on a rotary rotor using a rotational viscometer. For example, the viscosity thereof can be measured using VISCOTESTER. The measurement temperature of the viscosity is set to 25° C.

The viscosity measured by a rotational viscometer of the pet food for dogs of the present invention, which is not particularly limited as long as the viscosity thereof is in the range of 30 dPa·s to 70 dPa·s, is preferably in the range of 40 dPa·s to 65 dPa·s and more preferably in the range of 45 dPa·s to 55 dPa·s.

The fluidity of the pet food for dogs can be measured using a rotational viscometer. In addition, it is considered that an operation of mixing the entire amount of pet food for dogs of the present invention with dry type pet food is reflected in the measurement of the rotational viscometer. By setting the viscosity of the pet food for dogs to be in the above-described range, the pet food for dogs of the present invention is easily mixed with dry type pet food by a user and pet food for dogs which is easily mixed with dry type pet food can be obtained.

(Bostwick Viscometer)

The pet food for dogs of the present invention has a viscosity of 0.1 cm/min to 5.0 cm/min when measured by a Bostwick viscometer.

Figure 1B:
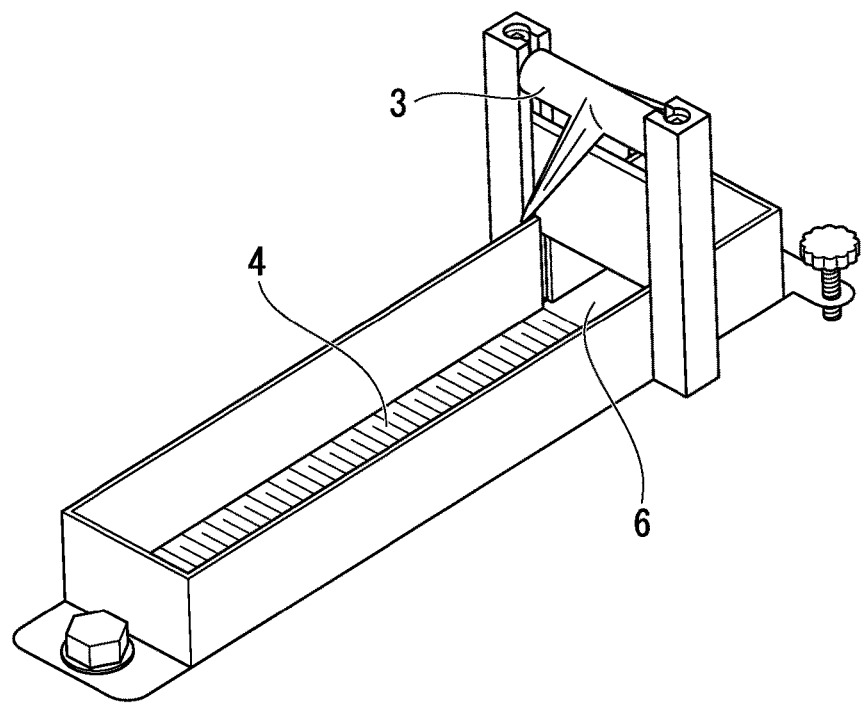
FIG. 1B is a perspective view schematically illustrating a Bostwick viscometer in a state in which the gate thereof is opened.

The Bostwick viscometer (Bostwick Consistmeter) is well-known in the food industry as a device for measuring the viscosity (consistency) of food. The appearance thereof is illustrated in FIGS. 1A and 1B. The method of measuring the viscosity using Bostwick viscometer is as follows. First, a predetermined amount of sample is added to an upstream portion 2 in a state in which a gate 1 is closed (FIG. 1A). Next, the time starts to be measured at the same time when the gate 1 is opened by turning a lever 3. When the gate 1 is opened, the sample 2 flows out toward a downstream portion 4 after passing through an opening portion 6 from the upstream portion 2 (FIG. 1B). After a predetermined time has passed, the reaching distance of the tip of the flowing sample is measured.

In the present invention, the distance thereof indicates a value measured under the following conditions.

The downstream portion 4 which is a slide was set to be in a state of being tilted by 1 degree in relation to the horizon by installing the measuring device on a horizontal table and adjusting a height adjustment screw 5. The respective widths of the downstream portion 4 and the upstream portion 2 are 5 cm. The measurement was performed under the conditions of a sample temperature of 25° C. and room temperature of 25° C. 92.5 mL of a sample is added to the upstream portion 2, the gate 1 is opened, and the reaching distance of the tip portion of the sample is measured after 1 minute had passed. The position of the gate 1 was the reference (0.0 cm) and the measurement is performed at intervals of 0.5 cm.

The viscosity measured by the Bostwick viscometer of the pet food for dogs of the present invention, which is not particularly limited as long as the viscosity thereof is in the range of 0.1 cm/min to 5.0 cm/min, is preferably in the range of 0.3 cm/min to 3.0 cm/min, more preferably in the range of 0.5 cm/min to 2.0 cm/min, and still more preferably in the range of 0.7 cm/min to 1.5 cm/min.

It is considered that the fluidity of the soup portion of the pet food is reflected in the measurement of the Bostwick viscometer. When the viscosity measured by the Bostwick viscometer of the pet food is set to be in the above-described range, pet food for dogs which is unlikely to make the container dirty can be obtained.

<Measurement of Amount of Fractions Passing Through Sieve>

It is preferable that the pet food for dogs of the present invention has a ratio of fractions, which do not pass through a sieve having a mesh of 10 mm, that is, a mesh-like filter whose one side has an opening of 10 mm (hereinafter, also referred to as a sieve having a mesh of 10 mm), of 70% by weight to 95% by weight with respect to the entire amount of pet food.

The method of examining the amount of fractions of the pet food passing through a sieve having a predetermined mesh or the amount of fractions thereof remaining on the sieve may be performed by placing the pet food on the sieve and examining the amount thereof passing through the sieve or remaining on the sieve after a predetermined time has passed. For example, the size of the mesh of the sieve may be in the range of 4 mm to 10 mm and the wire diameter thereof may be in the range of 1 mm to 2 mm, but the size of the mesh of the sieve is not particularly limited and a sieve having a mesh and a wire diameter suitable for measuring the physical properties of the pet food can be appropriately selected.

The predetermined time means the time up until the point that the fractions passing through a sieve are not increased due to gravity even when the time has passed, and is usually in the range of 0.1 hours to 24 hours. The area of the sieve is not particularly limited, but clogging may occur when a sieve having an extremely small area is used. A sieve having an area to the extent that clogging can be avoided may be used. In a case where the pet food is placed on a sieve, it is appropriate that the pet food is placed to generally have a thickness of 0.5 cm to 5.0 cm.

By examining the amount of the fractions passing through a sieve having a mesh in the above-described range or the amount of the fractions remaining on the sieve, the fluidity in which physical properties such as the hardness, brittleness, elasticity, and adhesiveness of the soup portion are totally reflected can be measured. In a case where the soup portion is not completely separated from the ingredients, the size of a complex of the soup portion and the ingredients can be measured. In a case where the soup portion has a certain extent of hardness, for example, in a gelee state, or in a case where the complex (the gelee portion and the ingredients) is not subdivided into portions smaller than the mesh-like opening portion on a sieve, the complex does not pass through the sieve. In addition, in the case where the soup portion is not separated from the ingredients at the time of measurement, the size of the soup portion and the ingredients can be respectively measured. In a case where the size of the ingredients is small enough to pass through a sieve having a mesh of 10 mm, the longest diameter (the length of the diameter) of the solid ingredients is shorter than 10 mm.

Alternatively, the ingredients are removed from the pet food using a pair of tweezers or the like without placing the entire amount of pet food on the sieve, the soup portion of the pet food is separated from the ingredient portion thereof, the soup portion and the ingredient portion are individually placed on the sieve, and then whether the soup portion and the ingredient portion pass through the sieve or remain on the sieve after a predetermined time has passed may be examined.

The amount of the fractions passing through the sieve having a predetermined mesh or the amount thereof remaining on the sieve in the present specification is the amount measured by the method of placing the entire amount of pet food on the sieve.

In the pet food for dogs of the present invention, the ratio of the fractions which do not pass through the sieve having a mesh of 10 mm is preferably in the range of 70% by weight to 98% by weight, more preferably in the range of 84% by weight to 96% by weight, still more preferably in the range of 86% by weight to 95% by weight, and still far more preferably in the range of 88% by weight to 94% by weight with respect to the entire amount of pet food.

A complex of the soup portion and the ingredients or ingredients whose size is not small enough to pass through the sieve having a mesh of 10 mm are unlikely to pass through the sieve having a mesh of 10 mm. The soup portion separated from the ingredients is unlikely to pass through the sieve having a mesh of 10 mm when the soup portion is in the form of a jelly with relatively low fluidity and is likely to pass through the sieve having a mesh of 10 mm when the soup portion is in a shape of gelee with relatively high fluidity.

In this manner, the fractions which do not pass through the sieve having a mesh of 10 mm contain a large amount of ingredients. The fractions passing through the sieve having a mesh of 10 mm contain a large amount of soup portion in the form of gelee with relatively high fluidity. When such fractions are contained in the pet food in a well-balance manner, the pet food is easily mixed with dry type pet food and the amount of the pet food that adheres to the container tends to be smaller.

It is preferable that the pet food for dogs of the present invention has a ratio of fractions, which do not pass through a sieve having a mesh of 4 mm, that is, a mesh-like filter whose one side has an opening of 4 mm (hereinafter, also referred to as a sieve having a mesh of 4 mm), of 75% by weight to 99% by weight with respect to the entire amount of pet food. The ratio of the fractions which do not pass through the sieve having a mesh of 4 mm is more preferably in the range of 90% by weight to 99% by weight, still more preferably in the range of 93% by weight to 99% by weight, and still far more preferably in the range of 97.5% by weight to 99% by weight.

That is, the ratio of the fractions passing through the sieve having a mesh of 4 mm is preferably in the range of 1% by weight to 25% by weight, more preferably in the range of 1% by weight to 10% by weight, still more preferably in the range of 1% by weight to 7% by weight, and particularly preferably in the range of 1% by weight to 2.5% by weight.

In the pet food, in a case where a liquid soup portion separated from ingredients is present, the liquid soup portion passes through a sieve having a mesh of 4 mm. In a case where the soup portion in the form of gelee forms a complex by being adhered to the ingredients, the adhesiveness of the soup portion to the ingredients is weak. When the fluidity of the soup portion is high, the complex is subdivided into portions smaller than the mesh-like opening portion on the sieve having a mesh of 4 mm and easily passes through the sieve having a mesh of 4 mm.

As the ratio of fractions passing through the sieve having a mesh of 4 mm becomes smaller, adhesion (food remnants on a dish) of the pet food to the container tends to be smaller.

In addition, the ratio of fractions which do not pass through the sieve having a mesh of 4 mm is greater than or equal to the ratio of fractions which do not pass through the sieve having a mesh of 10 mm.

In terms that the pet food is easily and excellently mixed with dry type pet food and adhesion (food remnant on the dish) to the container of the pet food is unlikely to be generated, it is preferable that the ratio of fractions which do not pass through the sieve having a mesh of 4 mm is in the range of 75% by weight to 99% by weight and the ratio of fractions which do not pass through the sieve having a mesh of 10 mm is in the range of 70% by weight to 98% by weight with respect to the entire amount of pet food. At this time, the ratio of fractions which pass through the sieve having a mesh of 10 mm and do not pass through the sieve having a mesh of 4 mm is in the range of 1% by weight to 29% by weight and preferably in the range of 5% by weight to 10% by weight.

Further, the sum of the ratio of fractions which do not pass through the sieve having a mesh of 10 mm and the ratio of fractions which pass through the sieve having a mesh of 10 mm and do not pass through the sieve having a mesh of 4 mm is equivalent to the ratio of fractions which do not pass through the sieve having a mesh of 4 mm.

It is more preferable that the ratio of fractions which do not pass through the sieve having a mesh of 4 mm is in the range of 90% by weight to 99% by weight and the fractions which do not pass through the sieve having a mesh of 10 mm is in the range of 84% by weight to 96% by weight. At this time, the fractions which pass through the sieve having a mesh of 10 mm and do not pass through the sieve having a mesh of 4 mm is in the range of 3% by weight to 15% by weight and preferably in the range of 5% by weight to 10% by weight.

It is more preferable that the ratio of fractions which do not pass through the sieve having a mesh of 4 mm is in the range of 93% by weight to 99% by weight and the fractions which do not pass through the sieve having a mesh of 10 mm is in the range of 86% by weight to 95% by weight. At this time, the fractions which pass through the sieve having a mesh of 10 mm and do not pass through the sieve having a mesh of 4 mm is in the range of 2% by weight to 13% by weight and preferably in the range of 5% by weight to 8% by weight.

It is particularly preferable that the ratio of fractions which do not pass through the sieve having a mesh of 4 mm is in the range of 97.5% by weight to 99% by weight and the fractions which do not pass through the sieve having a mesh of 10 mm is in the range of 88% by weight to 94% by weight. At this time, the fractions which pass through the sieve having a mesh of 10 mm and do not pass through the sieve having a mesh of 4 mm is in the range of 3.5% by weight to 11% by weight and preferably in the range of 4.5% by weight to 7% by weight.

<Gelling Agent and Thickener>

The gelling agent is not particularly limited as long as the gelling agent is a material that allows an aqueous solution to be gelled when added to the aqueous solution, and examples thereof include locust bean gum, carrageenan, agar, gellan gum, pectin, low methoxyl pectin, konjac mannan, alginic acid, sodium alginate, furcellarun, and gelatin. As the gelling agent used in the present invention, locust bean gum, carrageenan, agar, gellan gum, pectin, or alginic acid is preferable. In the carrageenan, there are three types of κ (kappa), ι (iota), and λ (lambda). In the present invention, all of these can be used, but κ (kappa) carrageenan is particularly preferable.

The degree of purification of the gelling agent is not particularly limited and a commercially available product can be used as the gelling agent.

The thickener is not particularly limited as long as the thickener is a material that increases the viscosity of an aqueous solution without allowing the aqueous solution to be gelled, and examples thereof include tragacanth gum, karaya gum, gum Arabic, xanthan gum, guar gum, tamarind seed gum, psyllium seed gum, gum Arabic, tara gum, starch, curdlan, pullulan, arabinogalactan, chitosan, and a cellulose derivative. As the thickener used in the present invention, xanthan gum, guar gum, starch, gum Arabic, or tara gum is particularly preferable. The degree of purification of the thickener is not particularly limited and a commercially available product can be used as the thickener.

Since the pet food for dogs of the present invention contains both of the gelling agent and the thickener described above, the pet food thereof is a gel-like and gelee type pet food with appropriate softness (fluidity) or appropriate viscosity. Because of these physical properties of the pet food for dogs of the present invention, pet food that has high palatability by dogs can be realized.

The concentration of the gelling agent and the thickener contained in the pet food for dogs of the present invention is not particularly limited as long as the physical properties of the pet food for dogs of the present invention are realized, but the concentration of the gelling agent is preferably in the range of 0.1% by weight to 5.0% by weight, more preferably in the range of 0.3% by weight to 1.0% by weight, and still more preferably in the range of 0.5% by weight to 0.7% by weight based on the soup portion. The concentration of the thickener is preferably in the range of 0.01% by weight to 1.0% by weight, more preferably in the range of 0.05% by weight to 0.5% by weight, and still more preferably in the range of 0.08% by weight to 0.2% by weight based on the soup portion.

The combination of the gelling agent and the thickener used in the pet food for dogs of the present invention is not particularly limited as long as the physical properties of the pet food for dogs of the present invention are realized by the combination. The number of use of the thickener and the gelling agent is not particularly limited as long as the combination contains at least one gelling agent and at least one thickener, and the combination may contain plural kinds of gelling agents and plural kinds of thickeners.

Preferable examples of the combination of the gelling agent and the thickener are as follows.

Locust bean gum, carrageenan, agar, and gellan gum are used as the gelling agents and xanthan gum is used as the thickener.

Locust bean gum, carrageenan, and agar are used as the gelling agents and guar gum and starch are used as the thickener.

Locust bean gum and carrageenan are used as the gelling agents and xanthan gum is used as the thickener.

In regard to the preferable ratio of the gelling agent to the thickener, a combination whose ratio of the gelling agent to the thickener is in the range of 15:1 to 1:1 is preferable, a combination whose ratio of the gelling agent to the thickener is in the range of 10:1 to 2:1 is more preferable, and a combination whose ratio of the gelling agent to the thickener is in the range of 7:1 to 3:1 is still more preferable.

<Ingredients>

The pet food for dogs of the present invention may contain flakes as ingredients. Here, the flakes are ingredients which account for a major proportion by weight as ingredients of the pet food, and meat or seafood is preferable as the ingredients. As specific examples of raw materials of the flakes, at least one raw material selected from a group consisting of cattle, chicken, sheep, pigs, tuna, bonito, sardines, barracuda, sea bream, flounder, mackerel, and horse mackerel is exemplified.

In the pet food for dogs of the present invention, the major axis of the flakes is preferably 15 mm or less.

Since the ingredients whose size is small enough to pass through the sieve having a mesh of 15 mm are sufficiently entangled with the gelee portion of the pet food and the ingredients are entangled with each other, the palatability for the pet food and the rate of complete eating of pet food can be improved. The preferable size thereof is the size in which a small dog (a dog with a weight of 1 kg to 14 kg) can easily eat the pet food.

<Raw Materials>

Raw materials constituting the pet food are not particularly limited and raw materials being used for pet food in the related art can be used. For example, meat derived from domestic animals such as cattle, pigs, and chickens and various kinds of fish can be used. In addition to the raw materials whose main component is protein, grains largely containing carbohydrate components normally required by pets or vegetable food largely containing dietary fibers may be used.

The pet food for dogs of the present invention may contain at least two ingredients selected from a group consisting of seafood, meat, vegetables, grains, mushrooms, eggs, and milk. When the ingredients are contained, the nutritional balance of the pet food is improved and thus the palatability of pets for the pet food can be improved. In a case where the pet food contains plural kinds of ingredients and, particularly, in a case where the pet food contains plural kinds of ingredients selected from the above-described ingredients, the nutritional balance of the pet food can be further improved and thus the palatability of pets for the pet food can be further improved.

Examples of the seafood include tuna, bonito, sardines, barracuda, sea bream, flounder, mackerel, horse mackerel, salmon, trout, saury, shrimp, crab, scallops, squid, and octopus. In addition, seafood processed products (boiled fish paste, tubular fish paste, or a fish ball) are also exemplified.

Examples of the meat include cattle, poultry, lamp, and pork. In addition, meat processed products (molding meat or sausages) are also exemplified.

Examples of the vegetables include cabbage, spinach, pumpkin, green pepper, carrots, burdock, potatoes, asparagus, soybeans, and green peas. In addition, vegetable processed products (tofu and the like) are also exemplified.

Examples of the grains include wheat and corn. In addition, grain processed products (biscuits, grain-containing imitation meat, and the like) are also exemplified.

Examples of the mushrooms include shitake mushroom and mushroom. In addition, mushroom processed products are exemplified.

Examples of the eggs include hen's eggs and quail eggs. In addition, egg processed products are exemplified.

Examples of the milk include cow's milk and goat's milk. In addition, milk processed products (cheese and the like) are exemplified.

In addition, as processed products using seafood, meat, vegetables, grains, mushrooms, eggs, and milk, plural kinds selected from the above-described examples may be used.

In the pet food for dogs of the present invention, the ratio of the ingredients is preferably 60% by weight or less, more preferably in the range of 10% by weight to 60% by weight, still more preferably in the range of 25% by weight to 55% by weight, and still far more preferably in the range of 35% by weight to 45% by weight with respect to the entire amount of pet food. When the ratio of the ingredients is adjusted to be 60% by weight or less with respect to the entire amount of pet food, that is, the ratio of the gelee portion thereof is adjusted to be greater than 40% by weight, the pet food for dogs of the present invention is easily entangled with dry type pet food and can be easily mixed with dry type pet food, the palatability for the entire amount of pet food after mixing can be improved, and thus the rate of complete eating of the pet food is improved.

The effects of the pet food for dogs of the present invention are particularly exhibited when wet type pet food is mixed with dry type pet food to feed a dog. Since the method of feeding a dog with wet type pet food by being mixed with dry type pet food is a normal method of feeding a dog, the product of the present invention is pet food for dogs.

The shape of ingredients of the dry type pet food is not particularly limited, and examples thereof include pellet (grains) shapes such as a spherical shape, a polyhedral shape, a cylindrical shape, a donut shape, a plate shape, and a go stone shape (circular, curved tablet, or oval).

In order to inform a pet owner of a pet that the pet food for dogs of the present invention is suitable for feeding a dog, the pet food can be sold by displaying the point that the pet food is suitable for a dog on the package at the time when the pet food for dogs of the present invention is packaged to be sold.

In the ranges of the present specification and the claims, the term "pet" indicates an animal that has been bred by a person. In a narrower sense, a pet is an animal cared for by the owner. In addition, the "pet food" indicates feed for pets. The pet food for dogs of the present invention can be produced and sold as the "feed for animals" or "food for animals."

<<Method of Producing Pet Food for Dogs>>

The pet food for dogs of the present invention is produced using a method including a process of adjusting the size of ingredients which contain flakes; a process of mixing the ingredients whose size is adjusted with raw materials of the soup portion to obtain a mixture of the ingredients and the raw materials of the soup portion; a process of filling a pouch container with the mixture of the ingredients and the raw materials of the soup portion; and a process of retort-sterilizing the pouch container.

When the size of the ingredients needs to be adjusted, the size thereof is adjusted to the size suitable for a pet to eat the pet food. The size thereof can be adjusted using a known technique. For example, a method of performing a mixing process on pet food to have a minced shape or a method of cutting pet food by a flaker is preferably used. The size of the flake may be adjusted by changing the speed and the time of the flaker and the number of times of passing through the flake.

In addition, the process of producing the pet food for dogs of the present invention includes a process of mixing a part or all of the ingredients, water, the gelling agents, the thickeners to obtain a mixture of ingredients and raw materials of the soup portion. The mixing method is not particularly limited, a mixer or a known method using a mixer can be used and, preferably, a method in which the mixture can be uniformly mixed is employed. Depending on the kind or properties of the ingredients, the thickeners, and the gelling agents, a material which is not mixed with the ingredients, the thickeners, and the gelling agents and is to be added to the above-described mixture after the ingredients, the thickeners, and the gelling agents are mixed may be present. The ingredients may be dispersed in the pet food.

The time and the temperature of mixing the raw materials of the pet food can be appropriately set. When the mixing time is adjusted, the size of the solid ingredients and the viscosity of the pet food can be adjusted. Further, when the amount of water to be mixed is adjusted, the viscosity and the moisture content of the pet food can be adjusted. The viscosity of the pet food can be adjusted by the blending amount of the thickeners.

The mixture of the all ingredients and raw materials of the soup portion of the pet food for dogs of the present invention is stored in a pouch container, to which pouch processing (laminate processing) is applied, used for known retort food in the related art or the like. As a method of filling the pouch container with the pet food, a known method can be used. At this time, in regard to the amount of the pet food to be stored in the container, approximately one feed may be stored in each container by dividing the pet food to small portions or multiple feeds (for example, three feeds) are collectively stored in a container having a large capacity.

Further, from a viewpoint of capability of long-term storage, the process of producing the pet food for dogs of the present invention includes a process of filling the pouch container with pet food and performing retort-sterilization using a known heat treatment or pressurizing treatment in the related art. The retort sterilization process is not particularly limited as long as sterilization is carried out under the condition in which the pet food is sufficiently sterilized and sterilization under the condition in which the flavor of the pet food after the sterilization treatment is not to deteriorate is carried out is preferable. The retort sterilization may be carried out under the conditions of a temperature range of 110° C. to 130° C. for 30 minutes to 50 minutes. When the heat treatment is carried out, the reactions of thickening and gelling of the thickener and the gelling agent are promoted.

It is preferable that the pet food for dogs of the present invention is put into the pouch container to be stored in a vacuum. Since the pouch container is a flexible container, the pet food can be easily taken out to the outside of the container. At this time, by taking the pet food out of the container by handling (squeezing) the pouch treatment, it is possible to avoid for the solid ingredients constituting the pet food to remain in the container. Since the solid ingredients are relatively minute, it takes time and labor for taking the solid ingredients out of the container when they remain in a can or a cup container. This problem can be solved using a pouch container. In general, even when pet food in a state of being inside of a can or a cup container is provided for a pet, it is difficult for the pet food to be eaten because the opening of the container is narrow and thus the pet food is left uneaten in many cases. Accordingly, it is important for the pet food to be easily taken out of the container. In addition, it is also important for the container after the pet food is taken out to be easily discarded and the pouch container is easy to be discarded because the pouch container is not bulky.

EXAMPLES

Hereinafter, the present invention will be described in detail with reference to Examples, but the present invention is not limited thereto. Hereinafter, "%" means "% by weight."

The production of pet food and measurement of physical properties thereof in Examples were carried out at room temperature (20° C. to 25° C.) unless otherwise the temperature is not particularly designated.

(Production of Pet Food)

First, gelling agents, thickeners, other raw materials, and ingredients were prepared at the blending ratio listed in Table 1 and mixed with one another for 5 minutes, thereby obtaining a mixture of the ingredients and the raw materials of a soup portion.

The flakes being used as ingredients and having a major axis of 15 mm or less was 100% by weight of the total amount of flakes.

TABLE 1

|  |  | Raw materials | Comparative Example 1 | Comparative Example 2 | Example 1 | Example 2 |
|---|---|---|---|---|---|---|
| Soup portion | Gelling agent | Locust bean gum | 0% | 0% | 0.06% | 0.06% |
|  |  | Carrageenan | 0.7% | 0% | 0.12% | 0.12% |
|  |  | Agar | 0% | 0% | 0.06% | 0.07% |
|  |  | Gellan gum | 0% | 0% | 0.06% | 0% |
|  | Thickener | Xanthan gum | 0% | 0% | 0.05% | 0% |
|  |  | Guar gum | 0.2% | 0.5% | 0% | 0.03% |
|  |  | Starch | 0% | 1.3% | 0% | 0.02% |
|  | Other raw materials | Seasonings | 2% | 2% | 2% | 2% |
|  |  | Water | Balance | Balance | Balance | Balance |
| Ingredients | Flakes | Chicken | 40% | 40% | 40% | 40% |
|  | Other ingredients | Carrot, green pea, corn | 6% | 6% | 6% | 6% |
|  |  | Total | 100% | 100% | 100% | 100% |
|  |  | Moisture content | 88.4% | 85.4% | 86.2% | 86.9% |
|  |  | Ratio of flakes having a major axis of 15 mm or less with respect to the total amount of flakes | 100% | 100% | 100% | 100% |
|  |  | Ratio of ingredients | 37.7% | 46.8% | 43.9% | 44.2% |

The pouch container was filled with the obtained mixture and subjected to a heat treatment at 118° C. for 40 minutes, thereby obtaining pet food of Comparative Examples 1 and 2 and Examples 1 and 2.

(Measurement of Physical Properties)

Commercially available wet type pet food was obtained and set as the pet food of Comparative Examples 3 to 5. Hereinafter, measurement and evaluations were performed on the pet food of Comparative Examples 3 to 5 in addition to the pet food of Comparative Examples 1 and 2 and Example 1.

The viscosity measurement on pet food using a rotational viscometer was performed with a viscosity measuring device (VISCOTESTER, model number: VT-03F, manufactured by RION Co., Ltd.). The viscosity thereof was measured by putting the entire amount of pet food into a 500 mL cup for measurement such that 90% or more of the cup was filled with the pet food and then mounting a tip for measurement. In addition, the tip was appropriately selected from accessories of tips for measurement according to the viscosity thereof.

The viscosity measurement on the pet food using a Bostwick viscosity measuring device was performed by measuring the entire amount of pet food under the above-described conditions with a Bostwick viscosity measuring device (model number: CSC 24925-000, manufactured by NIPPON Genetics Co., Ltd.).

The physical properties of the pet food using a sieve were measured by placing the entire amount of pet food on the sieve. In Comparative Examples 1 and 2 and Examples 1 and 2, 80 g of pet food was measured. In Comparative Examples 3 to 5, 40 g to 80 g of pet food was measured.

A sieve having a mesh of 4 mm and a wire diameter of 1.3 mm and a sieve having a mesh of 10 mm and a wire diameter of 1.5 mm were used. Pet food was placed on the sieve and the amount of pet food passing through the sieve for 10 minutes was measured.

The moisture content of the pet food was measured using the above-described normal pressure heating and drying method.

The measurement results of the moisture content of the pet food are listed in Table 1 and the measurement results of the physical properties of the pet food are listed in Table 2.

while softening the pet food for a test using a spoon. Evaluations whether the pet food was easily softened at the time of mixing both pet food and whether the dry type pet food was easily mixed with the pet food for a test were performed based on the following criteria.

The "degree of easiness of mixing pet food" was evaluated based on the following criteria.

A: The pet food for a test was easily softened and easily mixed with the dry type pet food while the pet food was mixed with each other.

B: It was somewhat difficult for the pet food for a test to be softened and to be mixed with the dry type pet food while the pet food was mixed with each other.

C: It was difficult for the pet food for a test to be softened and to be mixed with the dry type pet food while the pet food was mixed with each other.

[Evaluation of Food Remnant on Dish]

The adhesion (food remnant on a dish) of the pet food in Examples 1 and 2 and Comparative Example 1 to 5 to a container was evaluated based on the following criteria.

A: The adhesion (food remnant on the dish) of the pet food to the container was not conspicuous.

B: The adhesion (food remnant on the dish) of the pet food to the container was slightly conspicuous.

C: The adhesion (food remnant on the dish) of the pet food to the container was exceedingly conspicuous.

TABLE 2

|  | Comparative Example 1 | Comparative Example 2 | Comparative Example 3 | Comparative Example 4 | Comparative Example 5 | Example 1 | Example 2 |
|---|---|---|---|---|---|---|---|
| Viscosity (rotational viscometer) (dPa · s) | Could not measure | 22.0 | 80.0 | 50.0 | 13.0 | 48.0 | 53.0 |
| Viscosity (Bostwick viscosity measuring device) (cm/min) | 0.0 | 7.0 | 2.0 | 5.5 | 19.0 | 1.0 | 0.8 |
| Ratio of solids which do not pass through sieve having mesh of 10 mm (a) | 99.9% | 47.9% | 88.3% | 58.5% | 40.3% | 91.9% | 93.1% |
| Ratio of solids which do not pass through sieve having mesh of 4 mm (a + b) | 100.0% | 71.4% | 92.5% | 97.2% | 59.6% | 98.6% | 99.0% |
| Ratio of solids which pass through sieve having mesh of 10 mm and do not pass through sieve having mesh of 4 mm (b) | 0.1% | 23.5% | 4.2% | 38.7% | 19.3% | 6.7% | 5.9% |
| Food remnant on dish | A | C | B | C | C | A | A |
| Degree of easiness of mixing pet food | C | A | B | A | A | A | A |

(Evaluation of Feeling of Use)

Hereinafter, the ease of mixing the pet food and the state of adherence of the pet food to the container were evaluated.

[Evaluation of Degree of Easiness of Mixing Pet Food]

Each of 80 g of pet food (hereinafter, referred to as pet food for a test) of Examples 1 and 2 and Comparative Examples 1 to 5 was used by mixing with 50 g of dry type pet food.

As the dry type pet food, pet food formed of particles having a shortest diameter of 2 mm to 20 mm, a longest diameter of 5 mm to 30 mm, a shape of a grid, and a bulk density of 380 g/L to 440 g/L was used.

First, 50 g of dry type pet food was put into a container (a commercially available dish for dogs made of stainless steel) and then 80 g of pet food for a test was added thereto. The entire pet food was mixed with each other for 1 minute The measurement results of the physical properties of the pet food in Examples 1 and 2 and Comparative Examples 1 to 5 and the evaluation results of the degree of easiness of mixing pet food and the state of adherence of the pet food to the container are listed in Table 2.

From these results, it was understood that only the pet food for dogs in Examples 1 and 2 was easily mixed with dry type pet food and was unlikely to make the container dirty.

In addition, from the results listed in Table 2, at least the followings are evident. It is understood that the pet food whose viscosity measured by a rotational viscometer is 80 dPa·s or less and greater than 53 dPa·s is somewhat highly evaluated in terms of the degree of easiness of mixing pet food and the pet food whose viscosity measured by a rotational viscometer is 53 dPa·s or less is highly evaluated in terms of the degree of easiness of mixing pet food.

Further, it is understood that the pet food whose viscosity measured by a Bostwick viscosity measuring device is 2.0 cm/min or less and greater than 1.0 cm/min is somewhat highly evaluated in terms of the dirt condition of a dish and the pet food whose viscosity thereof is 1.0 cm/min or less is highly evaluated in terms of the dirt condition of a dish.

It is understood that the pet food whose ratio of fractions which do not pass through a sieve having a mesh of 10 mm is in the range of 88.3% to 93.1% is relatively highly evaluated in terms of the dirt condition of a dish and the degree of easiness of mixing pet food.

The respective configurations and the combinations thereof in the respective embodiment described above are merely examples and addition, omission, substitution, and other modifications of configurations are possible within the range not departing from the scope of the present invention. Further, the present invention is not limited by the respective embodiments and is limited only by the range of claims.

INDUSTRIAL APPLICABILITY

Pet food of the present invention can be widely applied as a feed for dogs.

REFERENCE SIGNS LIST

1: Gate
2: Upstream portion
3: Lever
4: Downstream portion
5: Height adjustment screw
6: Opening portion

The invention claimed is:

1. A dog food consisting essentially of:
   solid ingredients consisting of flakes, and at least two ingredients selected from a group consisting of seafood, meat, vegetables, grains, mushrooms, eggs, and milk, the flakes being derived from at least one raw material selected from the group consisting of cattle, chicken, sheep, pigs, tuna, bonito, sardines, barracuda, sea bream, flounder, mackerel, and horse mackerel; and
   a soup portion consisting of gelling agents selected from the group consisting of a combination of locust bean gum, carrageenan, agar and gellan gum and a combination of locust bean gum, carrageenan and agar, and at least one thickener selected from the group consisting of guar gum, starch, gum Arabic, and tara gum, and water,
   wherein the pet food is gel pet food,
   the moisture content is 50% by weight or greater,
   the viscosity measured by a rotational viscometer is in a range of 40 dPa·s to 70 dPa·S,
   the viscosity measured by a Bostwick viscometer is in a range of 0.1 cm/min to 5.0 cm/min,
   the major axis of the flakes is 15 mm or less, and
   the ratio of the gelling agent to the thickener is in the range of 15:1 to 1:1.

2. The dog food according to claim 1, wherein the ratio of fractions of at least one of the solid ingredients and the soup portion which do not pass through a sieve having a mesh of 10 mm is in a range of 70% by weight to 95% by weight.

3. The dog food according to claim 1, wherein the ratio of fractions of at least one of the solid ingredients and the soup portion which do not pass through a sieve having a mesh of 4 mm is in a range of 75% by weight to 99% by weight.

4. The dog food according to claim 1, wherein the ratio of the solid ingredients is 60% by weight or less with respect to the entire amount of the dog food.

5. A method of producing the dog food according to claim 1, comprising:
   a process of adjusting the size of solid ingredients consisting of flakes and at least two ingredients selected from the group consisting of seafood, meat, vegetables, grains, mushrooms, eggs and milk, the flakes being derived from at least one raw material selected from a group consisting of cattle, chicken, sheep, pigs, tuna, bonito, sardines, barracuda, sea bream, flounder, mackerel, and horse mackerel, and being adjusted such that the major axis of the flakes is 15 mm or less;
   a process of mixing the solid ingredients whose size has been adjusted with a soup portion consisting gelling agents selected from the group consisting of a combination of locust beau gum, carrageenan, agar and gellan gum and a combination of locust bean gum, carrageenan and agar, and at least one thickener selected from the group consisting of guar gum, starch, gum Arabic, and tara gum, and water to obtain a mixture of solid ingredients and the soup portion, the ratio of the gelling agents to the thickener being in the range of 15:1 to 1:1;
   a process of filling a pouch container with the mixture; and
   a process of retort-sterilizing the pouch container.

6. A method of feeding of dog food, comprising: feeding a dog by mixing the dog food according to claim 1 with dry pet food.

* * * * *